United States Patent
Hagiwara et al.

(10) Patent No.: US 8,941,783 B2
(45) Date of Patent: Jan. 27, 2015

(54) IMAGE OUTPUT SYSTEM, IMAGE SIGNAL GENERATION APPARATUS AND RECORDING MEDIUM

(71) Applicants: Aritaka Hagiwara, Kanagawa (JP); Reiji Yukumoto, Kanagawa (JP); Hidekuni Annaka, Saitama (JP); Yoko Sugiura, Kanagawa (JP)

(72) Inventors: Aritaka Hagiwara, Kanagawa (JP); Reiji Yukumoto, Kanagawa (JP); Hidekuni Annaka, Saitama (JP); Yoko Sugiura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/031,442

(22) Filed: Sep. 19, 2013

(65) Prior Publication Data

US 2014/0118619 A1 May 1, 2014

(30) Foreign Application Priority Data

Nov. 1, 2012 (JP) ................................. 2012-241821

(51) Int. Cl.
| H04N 9/74 | (2006.01) |
| H04N 5/445 | (2011.01) |
| H04N 21/436 | (2011.01) |
| H04N 21/442 | (2011.01) |
| H04N 21/472 | (2011.01) |
| H04N 21/482 | (2011.01) |
| H04N 21/488 | (2011.01) |

(52) U.S. Cl.
CPC ......... *H04N 5/44591* (2013.01); *H04N 21/436* (2013.01); *H04N 21/44227* (2013.01); *H04N 21/47217* (2013.01); *H04N 21/482* (2013.01); *H04N 21/4882* (2013.01)

USPC ........................................................ 348/588

(58) Field of Classification Search
None
See application file for complete search history.

(56) References Cited

U.S. PATENT DOCUMENTS

| 7,375,713 | B2 * | 5/2008 | Ota ................................. 345/98 |
| 7,589,789 | B2 * | 9/2009 | Choi ............................. 348/441 |
| 7,970,968 | B2 * | 6/2011 | Kondo et al. ................. 710/100 |
| 8,098,850 | B2 * | 1/2012 | Terada et al. ................. 381/119 |
| 2006/0033838 | A1 * | 2/2006 | Choi ............................. 348/441 |
| 2007/0180443 | A1 * | 8/2007 | Kondo et al. ................. 717/168 |
| 2009/0091656 | A1 * | 4/2009 | Kitaru et al. ................. 348/554 |
| 2009/0141180 | A1 * | 6/2009 | Kondo et al. ................. 348/723 |
| 2010/0171654 | A1 * | 7/2010 | Millard et al. ........... 342/357.09 |
| 2012/0210370 | A1 * | 8/2012 | Kim et al. ....................... 725/61 |

FOREIGN PATENT DOCUMENTS

JP        2007-327987        12/2007

* cited by examiner

*Primary Examiner* — Paulos M Natnael
(74) *Attorney, Agent, or Firm* — Oblon, Spivak, McClelland, Maier & Neustadt, L.L.P.

(57) ABSTRACT

An image output system includes plural channels from each of which an image signal is output, a switching unit for switching the channel that outputs the image signal to an image output unit based on connection states of the plural channels, an information display generation unit for generating the image signal of an information display screen related to the currently outputting channel, and a display state storing unit for storing a display state related to the information display screen, the display state including a "display-ON" state and a "display-OFF" state. In a case where there is a change in the connection state of the currently outputting channel, when there is the information display screen whose display state is the "display-ON" state, the switching unit switches the channel after waiting for a predefined change in the display state related to the information display screen.

10 Claims, 9 Drawing Sheets

IMAGE OUTPUT SYSTEM, IMAGE SIGNAL GENERATION APPARATUS AND RECORDING MEDIUM

BACKGROUND OF THE INVENTION

1. Field of the Invention

The disclosures herein generally relate to an image output system, an image signal generation apparatus and a recording medium. To be more in detail, the disclosures herein relate to an image output system, an image signal generation apparatus and a recording medium that stores a program, for outputting images by switching inputs of multiple channels.

2. Description of the Related Art

In recent years, projectors have made progress in terms of variety of available input sources. For example, some projectors are compatible with various video interfaces such as VGA (Video Graphics Array), HDMI (High-Definition Multimedia Interface), DVI (Digital Visual Interface), and DisplayPort (registered trademark). Also, some projectors are capable of projecting an image via a network using a network connection by a wired line or a wireless LAN, or are capable of projecting an image from a file stored in a USB (Universal Serial Bus) storage.

As the above progress is made in terms of the variety of available input sources, it has become difficult for a user to keep track of which input source is currently being used, and it has become cumbersome for a user to change channels. In order to save this kind of effort, some related-art projectors are provided with the function to search for a channel that has an input signal, and to switch the input source to the channel that has the input signal. By this, it becomes easy to select a source that is outputting signals and to project images.

For example, in Patent Document 1, a technology, whose object is to perform an auto-search and a video input terminal selection in a projection apparatus that has multiple video input terminals, is disclosed. In the projection apparatus according to Patent Document 1, an input key is included in a remote controller. When the input key is pressed by "short-pressing", an auto-search is triggered and an input is automatically switched to the video input terminal that has an input signal. On the other hand, when the input key is pressed by "long-pressing", signal names of the video input terminals are displayed one by one in sequence in a predefined period of time, and the video input is switched to the video input terminal whose signal name is displayed when the input key is released.

In the meantime, in the above projection apparatus, there may be a case where an alarm display screen related to the current projection is to be reported to a user. Such a case includes, for example, a case where, during a projection of a file in the USB storage, an error occurs in the USB storage or the USB storage is removed. At this time, if an auto-detection function such as the auto-search of Patent Document 1 is activated, then there is a possibility of a problem in which the above alarm display screen cannot be displayed appropriately.

For example, if an error occurs in the USB storage or the USB storage is removed, then as a response, the USB storage is un-mounted. Even if there is an error display screen regarding an input signal that should be reported to the user, the input signal is determined to exist by the auto-search only when there really exists the input signal. Therefore, as the USB storage is un-mounted, it is determined that the input signal does not exist in the channel for which the error display screen should be displayed, and the input channel is switched to another channel in which the input signal is determined to exist. As a result, the alarm display screen related to an error in the USB storage or to the removing of the USB storage is not reported to the user, and there is a possibility that the error is not noticed by the user and left unresolved.

[Patent Document 1] Japanese Patent Application Publication No. 2007-327987

SUMMARY OF THE INVENTION

It is a general object of at least one embodiment of the present invention to provide an image output system, an image signal generation apparatus and a recording medium that stores a program, that substantially obviate one or more problems caused by the limitations and disadvantages of the related art.

In one embodiment, in an image output system in which an input channel is switched according to states of multiple channels, the channel switching is performed after information related to the currently outputting channel is displayed appropriately.

An image output system according to the present embodiment includes a plurality of channels from each of which an image signal is output, and a switching unit configured to switch the channel that outputs the image signal to an image output unit based on the states of the plurality of the channels. The image output system further includes an information display generation unit configured to generate the image signal of an information display screen related to the currently outputting channel and a display state retaining unit configured to retain a state related to the information display screen. In the image output system, the switching unit, in the case where there is a change of a channel state which triggers the switching, when there is an output of the information display screen, the channel is switched after waiting for a predefined change of the state related to the information display screen.

According to the above configuration, in the image output system in which the image outputting channel is switched based on states of the plurality of the channels, the channel changing is performed after the information related to the currently outputting channel is appropriately displayed.

BRIEF DESCRIPTION OF THE DRAWINGS

Other objects and further features of embodiments will become apparent from the following detailed description when read in conjunction with the accompanying drawings.

DESCRIPTION OF THE PREFERRED EMBODIMENTS

In the following, embodiments of the present invention will be described with reference to the accompanying drawings.

The present invention is not limited to the following embodiments. Note that in the following embodiments, as an example of an image output system, a projector 110 is used in the description.

Figure 1:
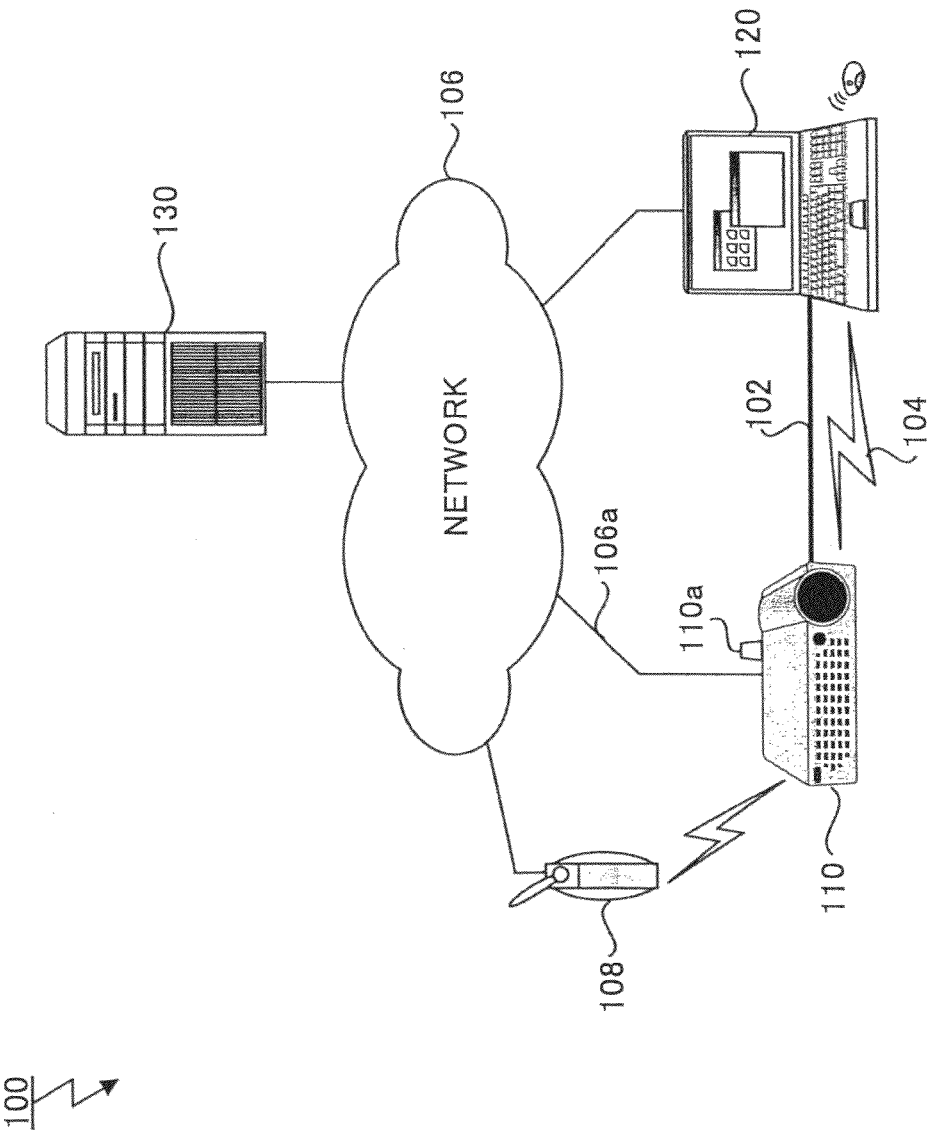
FIG. 1 is a drawing illustrating a connection configuration of a projector of a present embodiment.

FIG. 1 is a drawing illustrating a connection configuration 100 of the projector 110 of the present embodiment. The projector 110 shown in FIG. 1 is an image output apparatus which projects an inputted image or an image generated from an obtained file onto a screen, etc. Regarding an image projection method, it is not limited to a specific method, and various appropriate methods can be used such as a liquid crystal method, a CRT (Cathode Ray Tube) method, a DLP (Digital Light Processing) method, an LCOS (Liquid Crystal On Silicon) method, etc. The projector 110 also includes a network interface such as a NIC (Network Interface Card), a wireless LAN (Local Area Network) adaptor, etc., and is configured to be capable of being connected to external apparatuses via a network. The projector 110 further includes a video interface such as a HDMI, a DVI, a DisplayPort (registered trademark), a VGA terminal, an RGB composite, a D terminal, an S terminal, etc., and is configured to be capable of being connected to external apparatuses via the video interface.

The projector 110 shown in FIG. 1 is connected to an external information terminal 120 via the interfaces described above, and includes a function to project an image inputted from the information terminal 120 and an image based on an obtained file. Regarding the connection configuration between the projector 110 and the information terminal 120, a connection via a video interface 102 and connections via networks 104, 106 and 108 such as a LAN can be listed.

The network connection can be further implemented by a wired connection via a wired LAN 106, an infrastructure mode wireless connection via the wired LAN 106 and an access point 108, or a direct wireless connection via an ad-hoc mode wireless LAN 104. Here, the infrastructure mode or the ad-hoc mode is one of the operation modes of IEEE (The Institute of Electrical and Electronic Engineers) 802.11 wireless LAN.

The information terminal 120 is an image providing unit for outputting an image to be projected to the projector 110 and for transmitting a file to be projected to the projector 110. The information terminal 120 can be configured to be a general-purpose computer such as a personal computer, a workstation, etc., or a portable information terminal such as a tablet terminal, a smart phone terminal, a PDA (Personal Digital Assistance), etc. The information terminal 120 operates under the control of an appropriate operating system such as Windows (registered trademark), UNIX (registered trademark), LINUX (registered trademark), iOS (registered trademark), Android (registered trademark), etc. The information terminal 120 also includes a network interface and a video interface corresponding to the configuration of the projector 110.

The projector 110 further include a function to obtain a file stored in an external content management server 130 and to project the file image. The content management server 130 is an image providing unit for distributing a file to be projected to the projector 110. The content management server 130 is configured to be a general-purpose computer apparatus such as a personal computer, a workstation, a blade server, etc., an information apparatus such as a multifunction apparatus, and to include an FTP (File Transfer Protocol) function or a CMS (Content Management System) function. The connection between the projector 110 and the content management server 130 can be implemented by the above wired or wireless network connection.

The projector 110 further includes an interface for connecting to an external storage such as a USB (Universal Serial Bus) storage, an SD (Secure Digital) card, a CompactFlash (registered trademark), etc. The projector 110 includes a function for projecting an image of a file stored in a storage 110a that is connected to the projector 110.

As described above, the projector 110, which is, in general, capable of projecting images from various input sources, selects a channel from the various input source channels, and outputs an image based on the image signal from the channel. In a projector of the prior art, an input-coordinated channel switching function is included in which signal conditions of the channels are always monitored and, by detecting a signal condition change, the input channel is switched to a channel on which a signal is detected.

According to the above input-coordinated channel switching function, for example, in a function for projecting a file stored in a USB storage, the input channel can be switched in accordance with an inserting operation or a removing operation of the USB storage. As a result of an inserting operation, the signal state is determined to be "active" and the channel is selected, and as a result of a removing operation, the signal state is determined to be "non-active" and the input channel is switched to another channel.

However, in a system where an information display screen such as an alarm display screen, etc., is displayed for each channel, if the above input-coordinated channel switching function is activated, there is a possibility that a following problem could occur. For example, when an error occurs in the USB storage during the projection, there may be a case where the USB storage is un-mounted in accordance with the occurrence of the error. In this case, the input channel may be switched from the channel corresponding to the USB storage to another channel on which a signal is detected and the alarm display screen that is related to the error of the USB storage and should be reported to the user is not displayed.

In the present embodiment, a configuration is included in which, in the case where there is a change of a channel state which triggers the channel switching in the above input-coordinated channel switching function, when a predefined message display screen is to be outputted, the switching is performed after waiting for a message display acknowledgement operation, etc., by the user.

Figure 2:
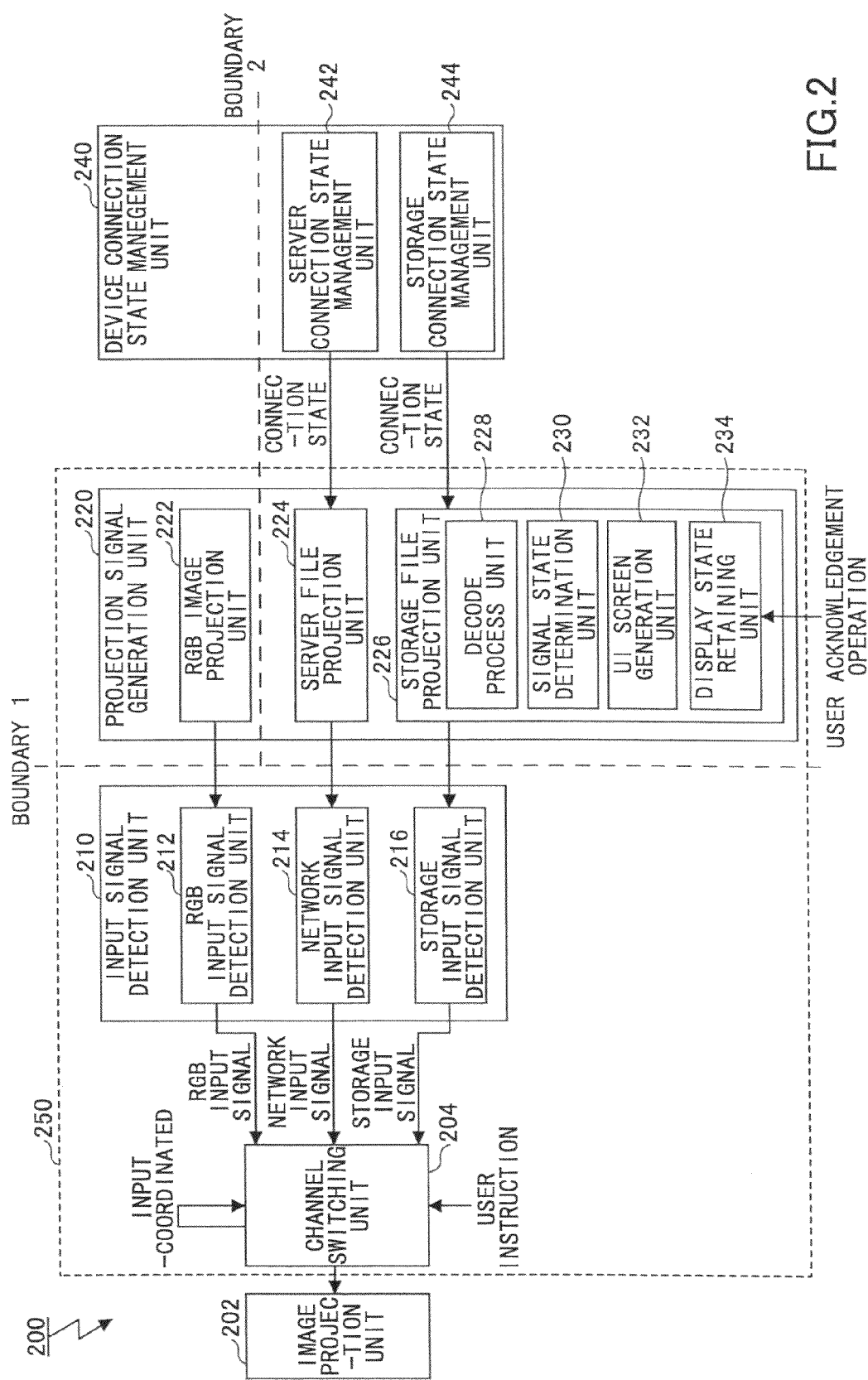
FIG. 2 is a functional block diagram related to an input-coordinated channel switching function in the projector of the present embodiment.

In the following, referring to FIG. 2 through FIG. 8, the input-coordinated channel switching function of the projector 110 according to the present embodiment is described. FIG. 2 shows a functional block diagram 200 related to an input-coordinated channel switching function in the projector 110 of the present embodiment. In the functional block diagram 200, functional units and processes to be described later are implemented by hardware such as a processor, a circuit block, etc., included in the projector 110.

The functional block diagram 200 shown in FIG. 2 includes an image projection unit 202, a channel switching unit 204, an input signal detection unit 210, a projection signal generation unit 220 and a device connection state management unit 240. The image projection unit 202 is an image output unit for projecting an image based on an image signal of a channel which is determined by the channel switching unit 204. The channel switching unit 204 is a unit configured to determine a channel from multiple channels included in the projector 110 for outputting an image signal to the image projection unit 202 based on a state of the image signal of each of the channels, and to output the image signal to the image projection unit 202. Note that, in the present embodiment, it is assumed that the image projection unit 202 projects an image of a single channel, but in other embodiments, it may be assumed that a screen is divided and images of two or more channels are projected on the screen.

Regarding the channel selection method, in the embodiments, there are a method in which an explicit switched-to channel instruction is received from a user and a method in which the channel that has a signal is determined by the above input-coordinated channel switching function based on states of input signals of the channels. The channel switching unit 204, while the input-coordinated channel switching function is activated, always monitors the states of the multiple channels and detects changes of the channel states. Note that regarding the channel selection method in the case of detecting multiple channels that have a signal, there is a method in which priorities are set for the channels and a channel that has a signal and has the highest priority is selected. Regarding a priority setting method in this case, there may be a method in which priorities are statically set in advance for the multiple channels or a method in which priorities are dynamically set in the order of signal detection timing in such a way that the highest priority is set for the channel on which a signal is detected most recently.

The input signal detection unit 210 is a unit for detecting existence or non-existence of an input signal of each of the channels, and includes a configuration in accordance with the channels included in the projector 110. Regarding the channels, in an embodiment shown in FIG. 2, though embodiments are not limited to this, there exist an RGB input channel corresponding to a video interface, a network input channel corresponding to a network connection, and a storage input channel corresponding to an external storage. The input signal detection 210 is configured to include, in accordance with the above channel configuration, an RGB input signal detection unit 212, a network input signal detection unit 214 and a storage input signal detection unit 216.

The projection signal generation unit 220 is an image signal generation unit which generates an image signal of an image generated from a file read from the outside or of an internally created image (including a menu screen and an alarm screen), and outputs the image signal to the input signal detection unit 210. The projection signal generation unit 220 is configured to include, corresponding to the above channel configuration the same as the input signal detection unit 210, an RGB image projection unit 222, a server file projection unit 224 and a storage file projection unit 226.

The RGB image projection unit 222 outputs an RGB image signal of a personal computer, etc. The server file projection unit 224 communicates with the content management server 130 on the network 106, reads a file stored in the content management server 130, performs a necessary decoding process, and generates and outputs an image signal. The storage file projection unit 226 communicates with the external storage connected to the projector 110, reads a file stored in this storage, performs a necessary decoding process, and generates and outputs an image signal.

The device connection state management unit 240, in accordance with the channel configuration, manages the states of connections with image providing units that provide projection images, and reports the connection states to the projection signal generation unit 220. In the embodiment shown in FIG. 2, a server connection state management unit 242 is included in accordance with the server file projection unit 224, and a storage connection state management unit 244 is included in accordance with the storage file projection unit 226. The server connection state management unit 242 and the storage connection state management unit 244 are included for communicating with devices of external image providing units and generating images to be projected.

The server connection state management unit 242 monitors a network connection state for communicating with the content management server 130 as the image providing unit, and reports the connection state to the server file projection unit 224. Regarding the network connection state to be managed, it may be a connection state in the connection layer, or a connection state in the IP layer. The server connection state management unit 242 also performs a network connection establishing process and a disconnecting process.

The storage connection state management unit 244 monitors an interface connection state for communicating with the storage device as the image providing unit, and reports the connection state to the storage file projection unit 226. The storage connection state management unit 244 also performs a storage device mounting process (connection establishing process) and an un-mount process (connection releasing process).

In the following, the projection signal generation unit 220 will be further described in detail. In the present embodiment, each of the projection units 222, 224 and 226 determines, based on the state of the corresponding channel, whether the image signal to be inputted to the following stage of the channel exists or not. In FIG. 2, regarding the detailed configuration of each of the projection units 222, 224 and 226, the storage file projection unit 226 is described as a representative. The storage file projection unit 226 includes more specifically a decode process unit 228, a signal state determination unit 230, a UI (User Interface) screen generation unit 232 and a display state retaining unit 234.

The decode process unit 228 performs a file decoding process based on the format of the obtained file and generates an image signal of a projection image. Files to be handled in terms of file formats can include, but are not limited to, image files of JPEG (Joint Photographic Experts Group) or GIF, video files of MPEG (Moving Picture Experts Group) or AVI (Audio Video Interleave), and document files of presentation or word processor. For example, if it is a JPEG file, it is decoded into an RGB image. The UI screen generation unit 232 generates, regarding the corresponding storage input channel, image signals for menu screens such as a file list display screen, etc., and for various kinds of internally generated information display screens such as an alarm screen, a setting screen, etc.

The display state retaining unit 234 is a unit that retains a display state value of the above various kinds of information display screens. As the display states, "display ON" and "display OFF" can be listed, and in general, the display state value is retained for each of the screens. For example, the display state of a screen is, responding to an occurrence of an event that requires a screen display such as an error event, switched to the "display ON" state, and responding to an operational event such as a screen acknowledgement operation by a user, switched to the "display OFF" state. In order to make sure that a message is known to the user, it is preferable to wait for an explicit acknowledgement operation by the user. However, in other embodiments, by assuming a sufficient time of the message display as an implicit acknowledgement by the user, responding to an internal event such as a timer event, the state may be switched to the "display OFF" state.

The signal state determination unit 230, regarding the corresponding storage input channel, determines whether there is an image signal input or not based on the connection state reported by the storage connection state management unit 244 and the display state of the message display screen (information display image) that is retained by the display state retaining unit 234. Note that, here, the screen, for which the display state for determining whether there is an image signal input is managed, can be a screen that includes information needed to be known to the user.

Regarding such information, information that should be reported to the user in accordance with the ending of a function can be listed, such as information indicating that a function has ended or information prompting a user to remove a device. Screens, which include information not necessarily needed to be known to the user, such as a mere background screen, a mere screen decoration element, a mere list of choices screen, etc., can be excluded from the screens for which the determination should be made. Regarding which screen should be included for determining whether there is an image signal input, it may be set by a manufacturer as a part of product specifications, or may be set by an administrator of the user side. Note that in the following description, an alarm screen responding to an error event of the storage is described as an example.

As is shown in a dotted-line rectangle 250 in FIG. 2, a switching unit according to the present embodiment, which switches a channel based on states of the multiple channels, is configured to include the channel switching unit 204, the input signal detection units 212 through 216 and projection units 222 through 226.

In an embodiment shown in FIG. 2, the storage file projection unit 226 determines whether there is an image signal input based on the connection state from the storage connection state management unit 244 and the display state of the alarm display screen. Then, the channel switching unit 204 switches the channel in accordance with whether there is an image signal input or not in each of the channels. By this kind of operation, channel switching in accordance with the connection state and the display state of the alarm screen can be implemented. Note that in the following description, as an example, a storage input channel such as a USB storage is mainly described, but the present embodiment can be applied to a network input channel in the same way.

Note that in FIG. 2, it is described that function units 202, 204, 210, 220, and 240 are included in a single apparatus, the projector 110, but an embodiment is not excluded in which function units are distributed and implemented in multiple apparatuses. In a specific embodiment, as indicated by "boundary 1" in FIG. 2, the RGB image projection unit 222 may be implemented in an information terminal such as a personal computer.

Also, in other embodiment, as indicated by "boundary 2" in FIG. 2, the server file projection unit 224, the server connection state management 242, the storage file projection 226 and the storage connection management unit 244 can be implemented in an optional module. In this embodiment, by additionally installing the option in the projector 110, the channels included in the projector 110 are enhanced. Also, not shown in the figure, the server file projection unit 224 and the server connection state management unit 242; and the storage file projection unit 226 and the storage connection state management unit 244 may be separately implemented in separate option modules. Note that the above option modules are configured to be included in the image signal generation apparatus according to the present embodiment.

In the following, referring to FIG. 3 and FIG. 4, the input-coordinated channel switching function will be described in detail. Note that in FIG. 3 and FIG. 4, the flow is described from a step of installing the storage device to steps of selecting a file to be projected from a file list, performing a file projection and ending the function.

Figure 3:
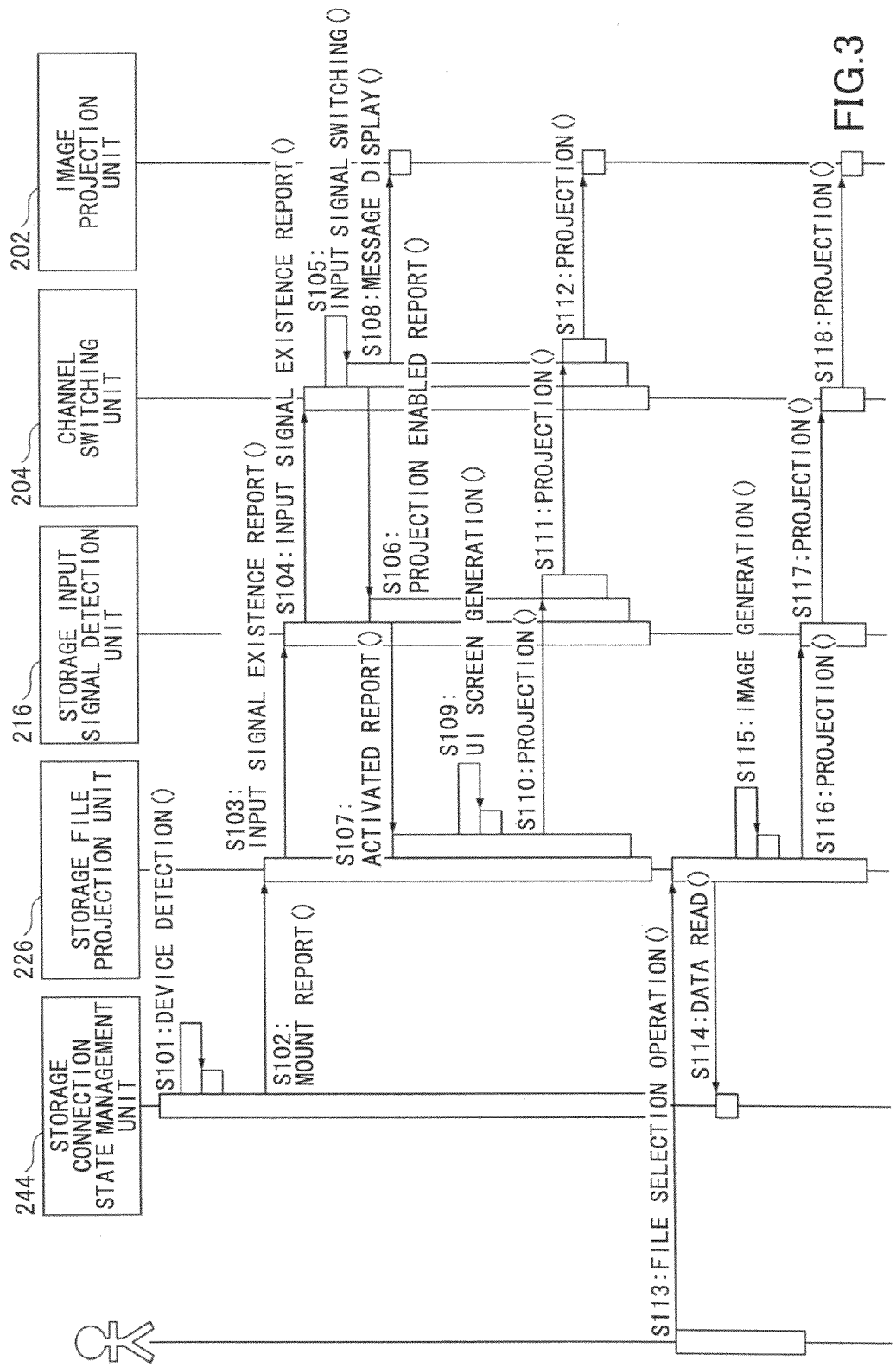
FIG. 3 is a sequence chart illustrating an input-coordinated channel switching process (from storage installation to file projection) performed by the projector of the present embodiment.

FIG. 3 is a sequence chart illustrating an input-coordinated channel switching process (from storage installation to file projection) performed by the projector 110 of the present embodiment. The process shown in FIG. 3 starts from step S101, and the storage connection state management unit 244 detects the device connection in response to the physical installation of the storage device. In step S102, the storage connection state management unit 244 reports to the storage file projection unit 226 that the storage device is mounted (that is, that the state has become "connection ON").

In step S103 and step S104, the storage file projection unit 226 reports to the channel switching unit 204 via the storage input signal detection unit 216 that there is a signal input in the storage input channel. In step S105, the channel switching unit 204 recognizes that a signal is detected in the storage input channel, and switches an input signal channel in accordance with the states of the multiple channels. Here, the flow will be described assuming that the input signal channel is switched to the newly detected storage input channel.

In step S106, the channel switching unit 204 reports to the storage input signal detection unit 216 that this channel is enabled for projection. In step S107, the storage input signal detection unit 216 reports to the storage file projection unit 226 that this channel is active. Here, a projection unit that can request the image projection unit 202 for the image projection is limited to such a projection unit that corresponds to an active channel. Also, the channel switching unit 204, after switching the input signal channel, in step S108, causes the image projection unit 202 to project a message for notifying a user that the input signal channel is switched.

In step S109, the storage file projection unit 226, upon receiving an activation report, generates a list display screen that shows a list of files in the storage. In step S110 through step S112, the storage file projection unit 226 causes the image projection unit 202 to project the generated list display screen via the storage input signal detection unit 216 and the channel switching unit 204.

In step S113, the storage file projection unit 226, receives notification of a certain file selection operation performed by the user, and in step S114, reads the data of the selected file from the storage device via the storage connection management unit 244. In step S115, the storage file projection unit 226 decodes the read file and generates an image. In step S116 through step S118, the storage file projection unit 226, via the storage input signal detection unit 216 and the channel switching unit 204, causes the image projection unit 202 to project the image generated based on the read file.

Figure 4:
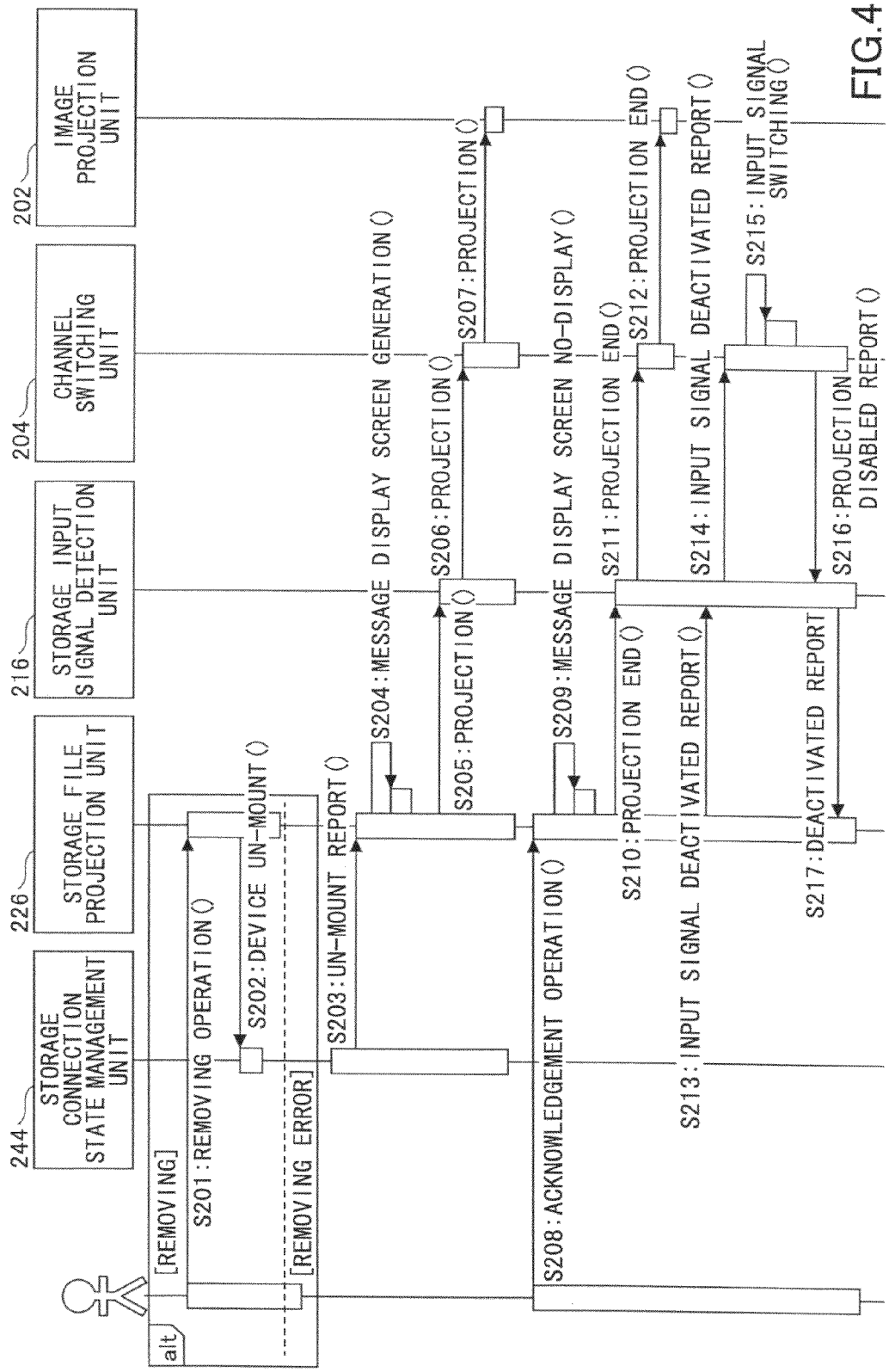
FIG. 4 is a sequence chart illustrating an input-coordinated channel switching process (to the end of the function based on a removing of a storage or a drawing-out error of a storage) performed by the projector of the present embodiment.

FIG. 4 is a sequence chart illustrating the input-coordinated channel switching process (to the end of the function based on a removing of the storage or a drawing-out error of the storage) performed by the projector 110 of the present embodiment. The process shown in FIG. 4, in the case where the removing of the storage device is performed based on the user instruction, starts from step S201. In step S201, the storage file projection unit 226 is notified of a user operation instructing to remove the device, and in step S202, causes the storage connection state management unit 244 to un-mount the device, and moves to step S203. On the other hand, in the case where, instead of the normal device removing based on the user instruction, the abnormal device removing is performed, or in the case where there occurs an error in the device, the process starts from step S203.

In step S203, the storage connection state management unit 244 reports to the storage file projection unit 226 that the storage device has been un-mounted (that is, the state has become "connection OFF"). In step S204, the storage file projection unit 226 generates a message display screen for reporting the end of the function. Regarding the message display screen, in the case of a normal device removing operation by the user, the end of the function screen, which reports that the function has ended, is generated. On the other hand, in the case of the abnormal device removing operation, or in the case of an occurrence of an error in the device, an alarm screen, which reports the alarm in addition to the end of the function, is generated. In step S205 through S207, the storage file projection unit 226, via the storage input signal detection unit 216 and the channel switching unit 204, causes the image projection unit 202 to project the generated message display screen.

In the present embodiment, even in the case where the storage device is un-mounted, the signal input is not inactive right after the message display screen is projected. In step S208, the storage file projection unit 226 is notified of an acknowledgement operation performed by the user for the message display screen regarding the end of the function or the alarm, and in step S209, changes the display state of the message display screen to the "display OFF". In step S210 through S212, the storage file projection unit 226, via the storage input signal detection unit 216 and the channel switching unit 204, causes the image projection unit 202 to end the projection of the message display screen.

In the present embodiment, after the storage device is un-mounted, further after the acknowledgement operation for the message display screen is detected, the signal input is caused to be inactive. In step S213 and step S214, the storage file projection unit 226, via the storage input signal detection unit 216, reports to the channel switching unit 204 that the signal input of the present storage input channel is inactive. In step S215, the channel switching unit 204 recognizes that the signal of the storage input channel is inactive, and switches the input signal channel in accordance with the states of the multiple channels. Here, the description will be continued assuming that the signal input channel is switched to another channel in which an input signal is detected.

In step S216, the channel switching unit 204 reports to the storage input signal detection unit 216 that the present channel is disabled for projection. In step S217, the storage input signal detection unit 216 reports to the storage file projection unit 226 that the present channel is inactive.

In the above, referring to FIG. 3 and FIG. 4, functions of the function units of the projector 110 have been described in the flow from a step of installing the storage device to steps of selecting a file from a file list, performing a file projection and ending the function. In the following, referring to FIG. 5 through FIG. 8, functions and operations of the storage file projection unit 226 will be further described in detail.

Figure 5:
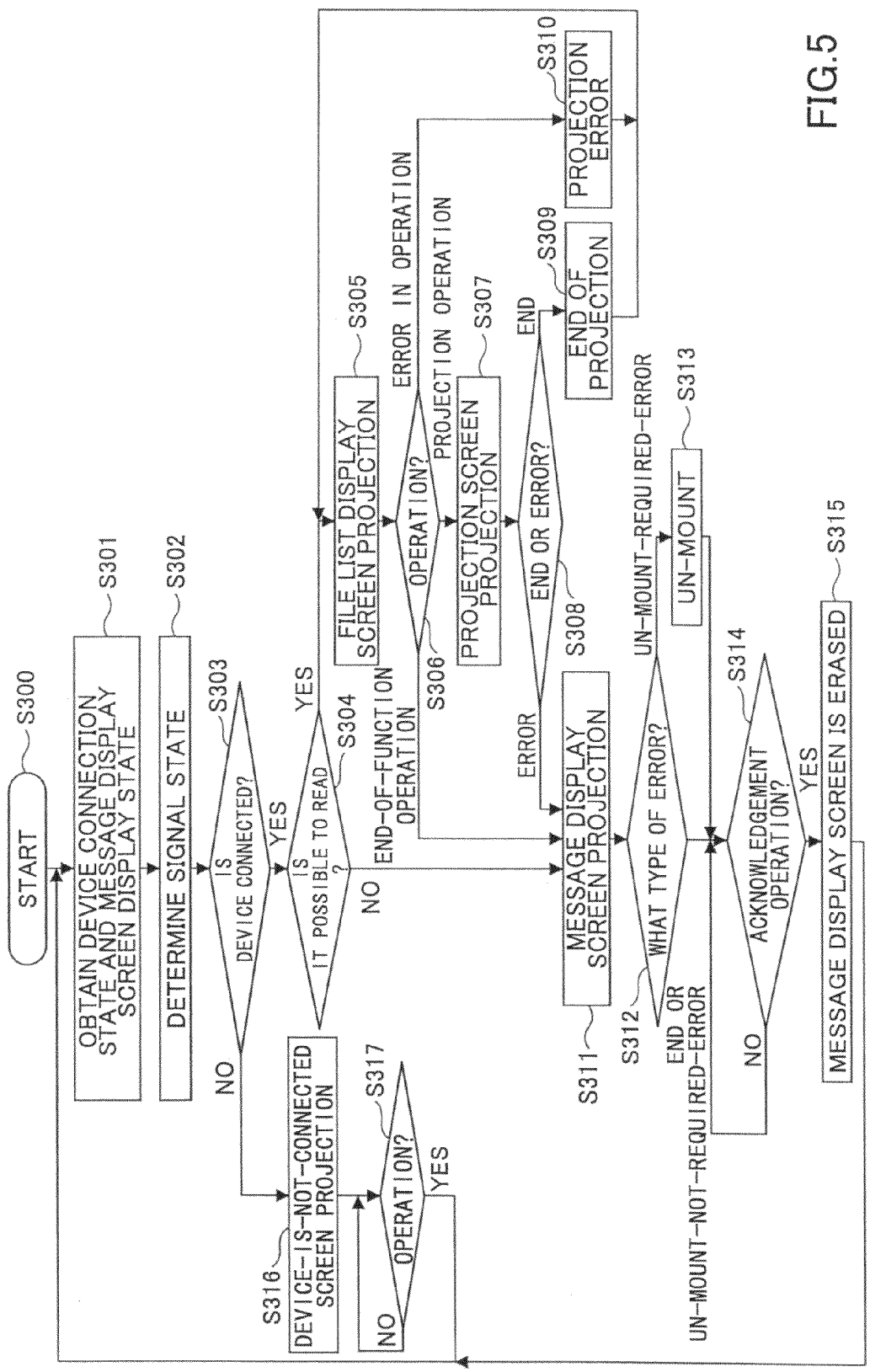
FIG. 5 is a flowchart illustrating a process related to the input-coordinated channel switching function performed by a storage file projection unit in the projector of the present embodiment.
Figure 6:
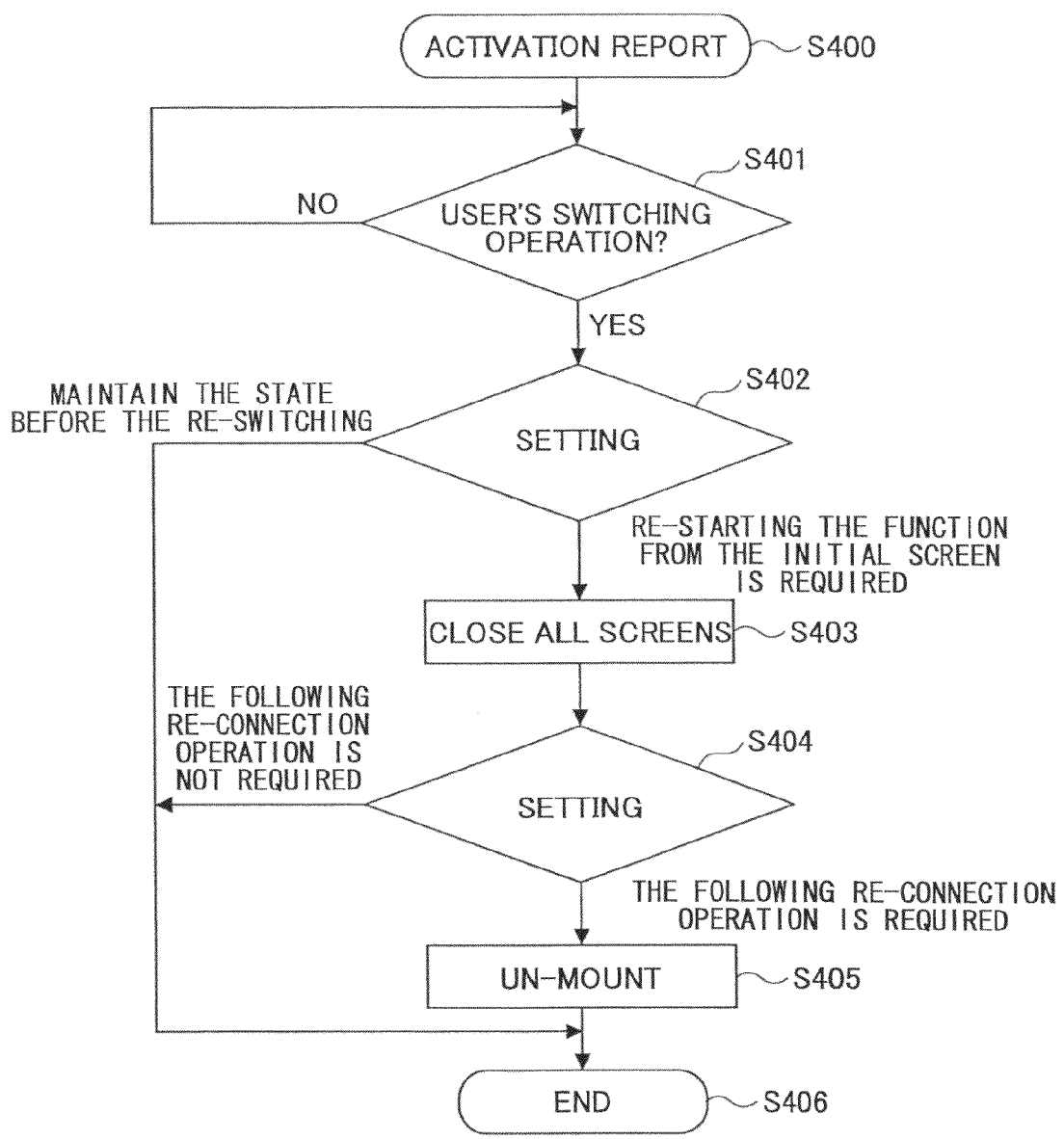
FIG. 6 is a flowchart illustrating a process related to a user's manual channel switching performed by the storage file projection unit in the projector of the present embodiment.

FIG. 5 is a flowchart illustrating a process related to the input-coordinated channel switching function performed by the storage file projection unit 226 in the projector 110 of the present embodiment. FIG. 6 is a flowchart illustrating a process related to a user's manual channel switching performed by the storage file projection unit 226 in the projector 110 of the present embodiment. FIGS. 7A, 7B, 8A and 8B are drawings illustrating examples of various screens generated by the storage file projection unit 226.

A process shown in FIG. 5 starts from step S300 in response to, for example, the start-up of the projector 110. In step S301, the storage file projection unit 226 obtains its state of connection with the storage device and the display state of the determination-target message display screen. In step S301, the storage file projection unit 226 determines the state of a signal of the storage input channel based on the connection state and the display state. The relationships among the connection state, the display state and the corresponding signal state are shown in the following table 1.

TABLE 1

| | INPUT | | |
| NUMBER | DISPLAY STATE OF MESSAGE SCREEN | CONNECTION STATE WITH DEVICE | OUTPUT SIGNAL STATE |
| --- | --- | --- | --- |
| 1 | OFF | OFF | NO (INACTIVE) |
| 2 | | ON | YES (ACTIVE) |
| 3 | ON | OFF | YES (ACTIVE) |
| 4 | | ON | YES (ACTIVE) |

Accordingly, in the sequence chart shown in FIG. 3, in step S102, in the case where the mounting of the storage device is reported, the signal state is determined to be "YES (ACTIVE)" regardless of the display state of the message display screen. In step S303, the storage file projection unit 226 performs different processes depending on the connection state.

In step S303, in the case where the device is determined to be not connected (NO for S303), the process moves to step S316. In step S316, the storage file projection unit 226 generates a screen for reporting to a user that the storage device is not connected, and projects the screen on the image projection unit 202. In step S317, the storage file projection unit 226 waits for a message acknowledgement operation or a device connection operation by the user.

Figure 7A:
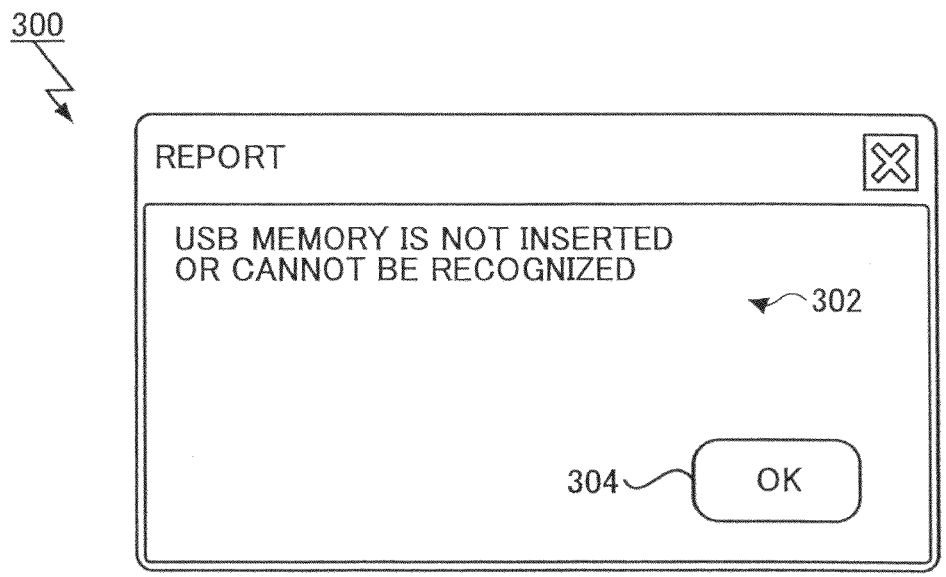
FIGS. 7A and 7B are drawings illustrating examples of various screens generated by the storage file projection unit (1/2).

FIG. 7A is an example of a device-not-connected screen which should be projected in step S316. The device-not-connected screen shown in FIG. 7A includes a message display image 302 and an acknowledgement button 304 which receives an explicit acknowledgement operation of the user. In step S317, in the case where it is determined that there is a user operation in accordance with the user's operation of the acknowledgement button 304 or with the user's inserting of the storage device (YES for step S317), the process moves back to S301 and the signal state is determined again.

On the other hand, in step S303, in the case where it is determined that the device is connected (YES for step S303), the process moves to step S304. In step S304, the storage file projection unit 226 determines whether it is possible to read data. In the case where it is determined that it is possible to read data (YES for step S304), the process moves to step S305. In step S305, the storage file projection unit 226 obtains a list of files from the storage device, generates a file list display screen and projects it on the image projection unit 202.

Figure 8A:
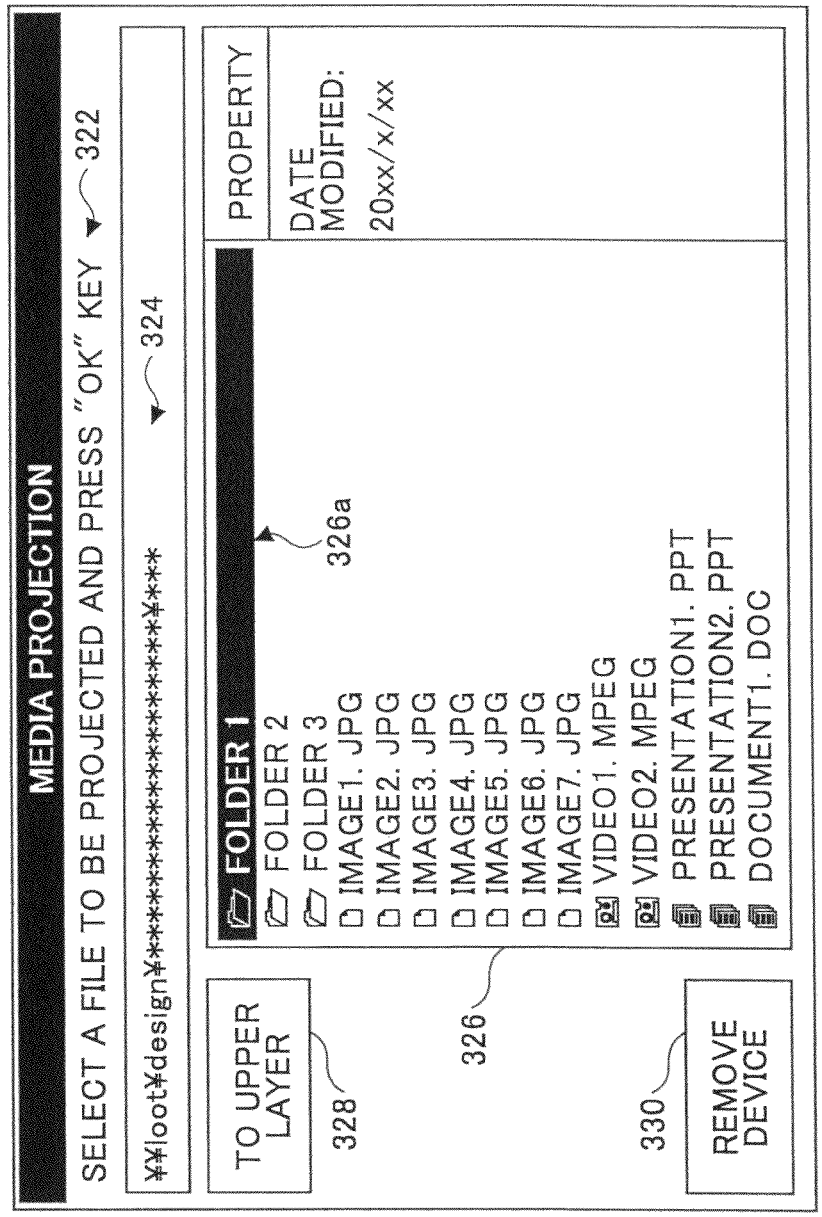
FIGS. 8A and 8B are drawings illustrating examples of various screens generated by the storage file projection unit (2/2).

FIG. 8A is an example of the file list display screen 320 that the storage file projection unit 226 generates. The file list display screen 320 includes a message display 322 that prompts a file selection operation, a text box 324 that displays the current path and a layer display area 326 where folders and files in the current layer are listed. The file list display screen 320 further includes a layer moving button 328 for moving to an upper layer and an end of function button 330 for instructing to remove the device. In an example shown in FIG. 8A, a "FOLDER 1" is selected by a cursor.

Figure 8B:
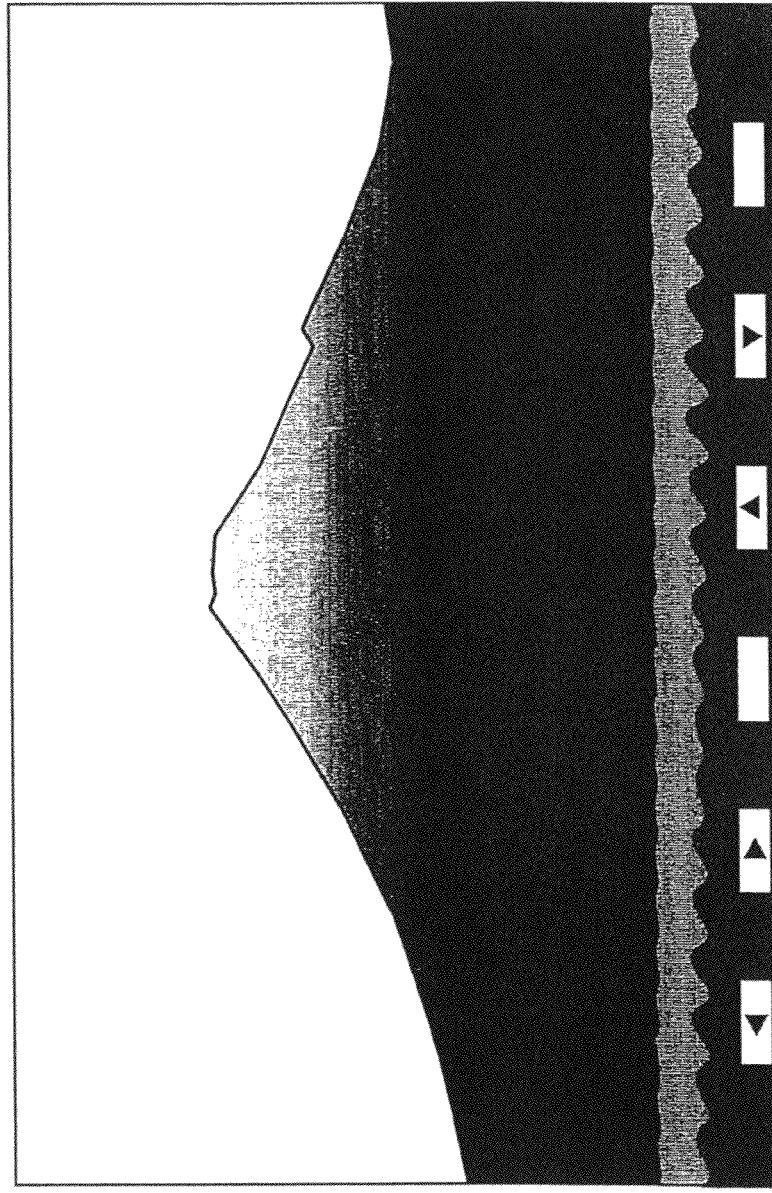

In step S306, the process moves to a corresponding step in accordance with the type of operation in the file list display screen. In the case where an operation of projection instruction of a selected file (PROJECTION OPERATION for step S306) is performed, the process moves to step S307. This operation of the projection instruction may include, for example, an operation of pressing an OK key included in the projector 110 while a certain file is selected by the cursor. If the projection operation is performed, then, in step S307, the storage file projection unit 226 reads the selected file, generates a projection image by a decoding process, and starts the projection onto the image projection unit 202. FIG. 8B is an example of a file projection screen 340 generated by the storage file projection unit 226.

In step S308, the process moves to a corresponding step in accordance with whether, after the start of the file projection, the file projection is ended normally by receiving an ending instruction or by reaching the last picture of a slide show or the last frame of a moving picture, or the file projection is aborted by an error during the projection. In the case where the file projection is ended by, for example, an operation on a menu 342 of the projection screen 340 (END for step S308), the process moves to step S309. In step S309, the storage file projection unit 226 displays a screen reporting the end of the projection of the selected file. Then the process returns to step S305 and the storage file projection unit 226 displays the file list display screen again.

Returning to step S306, in step S306, in the case where an error occurs during the projection operation (ERROR IN OPERATION for step S306), the process moves to step S310. In step S310, the storage file projection unit 226 displays a screen reporting an error of the file projection. Then the process returns to step S305 and the storage file projection unit 226 displays the file list display screen again.

On the other hand, in step S306, in the case where an end-of-function operation is performed by an operation on an end-of-function button 330 in the file list display screen 320 shown in FIG. 8A (END-OF-FUNCTION OPERATION for step S306), the process moves to step S311. The process also moves to step S311 in the case where an error in reading the device occurs during the projection in step S308 (ERROR for step S308). Furthermore, the process also moves to step S311 in the case where it is determined that there is an error in reading the device in step S304 (NO for step S304).

Figure 7B:
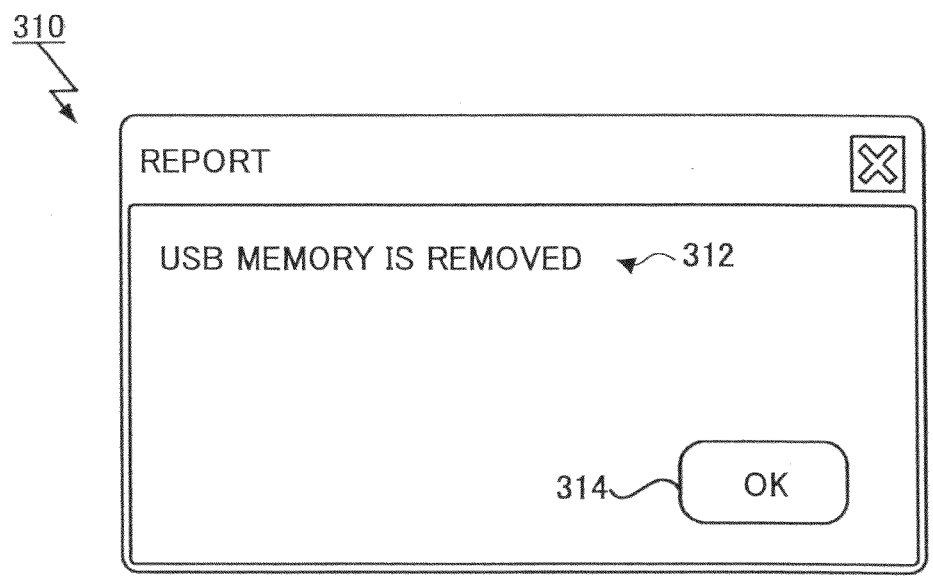

In step S311, the storage file projection unit 226 projects a message display screen in accordance with the step route before reaching step S311. In the case where the end-of-function operation is performed in step S306, the storage file projection unit 226 displays an end-of-function screen. In the case where it is determined that there is an error in reading the device, and in the case where it is determined that an error occurs in step S308, the storage file projection unit 226 displays an alarm screen reporting an alarm together with the end-of-function. FIG. 7B is an example of the alarm screen 310 projected in step S311. The alarm screen 310 shown in FIG. 7B includes a message display 312 that reports that the storage device is removed, and an acknowledge button 314 that receives an explicit acknowledgement of the user.

In step S312, the process of the storage file projection unit 226, in the case where an error occurs, moves to a corresponding step in accordance with the type of the error. In step S312, in the case where it is determined that the error is predefined to require an un-mount (UN-MOUNT-REQUIRED-ERROR for step S312), the process moves to step S313. In step S313, the storage file projection unit 226 requests an un-mount to the storage connection state management unit 244 and the process moves to step S314. The storage connection state management unit 244, in response to a request made in accordance with a predefined error that occurs during the device connection, performs the un-mount of the device of the corresponding channel. On the other hand, in step S312, in the case where it is determined that an error does not occur that is predefined to require an un-mount (END OR UN-MOUNT-NOT-REQUIRED-ERROR), the process moves to step S314. Regarding the error, whether it requires an un-mount or not can be determined by the predefined table shown in the table 2 below.

TABLE 2

| NUMBER | ERROR TYPE | UN-MOUNT REQUIREMENT |
|---|---|---|
| 1 | PROJECTION ERROR | NOT REQUIRED |
| 2 | INVALID DEVICE | REQUIRED |
| : | : | : |

In the above table 2, a minor error such as a projection error can be set to be un-mount-not-required. In this way, by determining whether an un-mount is required or not, when an error occurs, in the case where the error allows a subsequent projection, the user can continue the file projection after the message acknowledgement operation. In the case where a serious error occurs, such as in the case where it is detected that the device cannot be read, the un-mount is performed even if the device is in the connected state. Therefore, an infinite loop of a "display ON" state and a "display OFF" state of the message can be avoided in which after the message display screen is removed, when the device is accessed again, the error message is displayed again.

In step S314, the user's acknowledgement operation for the message display screen displayed in step S311 is awaited. In step S314, the process is continuously looped while the acknowledgement operation is not received (NO for step S314). When the acknowledgement operation is received (YES for step S314), the process moves to step S315. In step S315, the storage file projection unit 226 changes the state of the message display screen displayed in step S311 to "display OFF", the process moves back to step S301, and the state determination is performed again.

In step S301, whether a signal exists or not is determined based on the relationship shown in table 1. Therefore, in the sequence chart of FIG. 4, in step S204, even in the case where the un-mount of the storage device is reported, the state of the message display screen is the "display ON" state until the acknowledgement operation is performed. Also, the process is configured to move to step S301 after waiting for the acknowledgement operation in step S314. Therefore, it is preferably avoided that the signal is caused to be non-active during the projection of the message display screen and that the channel is switched to a different channel due to the above input-coordinated channel switching function. After the un-mount, when the user's acknowledgement operation is performed and the state of the message display screen is caused to be "display OFF", in the following step S301, the signal is determined to be non-active based on table 1.

Also, in the above input-coordinated channel switching function, even in the case where the device is un-mounted, by mounting the device again before the acknowledgement operation, the input signal is not caused to be inactive and the projection function can be used continuously. The reason is that in response to the user operation event, the channel state is determined again at a timing when the displayed information display screen is caused to be "display OFF", and in the case where the channel is in the connected state at the timing, the channel switching is not performed. This kind of feature is useful in the case where it is required to change the storage device during the projection.

In the following, referring to FIG. 6, a process in a case where a user's manual channel switching is performed is described. The process shown in FIG. 6 starts from step S400 in response to the activation of the storage file projection unit 226. In step S401, the storage file projection unit 226 determines whether the user's explicit switching operation is detected. In the case where the user's explicit channel switching operation is not detected (NO for step S401), the process continuously loops at step S401. On the other hand, in the case where the user's explicit channel switching operation is detected (YES for step S401), the process moves to step S402.

In step S402, the process of the storage file projection unit 226 moves to a step in accordance with a setting. The setting is for determining, when the channel is re-switched to the original channel after it is switched to a different channel by the user's explicit instruction, whether to maintain the state before the re-switching or to re-start the function from the initial screen. The above determination can be made according to the type of the projection unit or it can be set in advance by the user.

In step S402, in the case where the maintaining the state before the re-switching is selected (MAINTAIN THE STATE BEFORE THE RE-SWITCHING for step S402), the process moves to step S406 and the process ends. On the other hand, in step S402, in the case where it is selected that the re-starting the function from the initial screen is required (RE-STARTING THE FUNCTION FROM THE INITIAL SCREEN IS REQUIRED for step S402), the process moves to step S403. In step S403, the storage file projection unit 226 causes all of the displayed message display screens to be "display OFF" and the process moves to step S404.

In step S404, the process of the storage file projection unit 226 moves to a step depending on the setting. The setting is for determining, when the channel is switched to the original channel, whether to cause the device re-connection operation to be required or not required. The above determination can be made according to the type of the projection unit or it can be set in advance by the user.

In step S404, in the case where the device re-connection operation is required (THE FOLLOWING RE-CONNECTION OPERATION IS REQUIRED for step S404), the process moves to step S405. In step S405, the storage file projection unit 226 requests the storage connection state management unit 244 for an un-mount of the storage device, and the process ends in step S406. Here the input signal is caused to be inactive because the connection state is "connection OFF" due to the un-mount and the states of all message display screens are "display OFF". On the other hand, in step S404, in the case where the device re-connection operation is not required (THE FOLLOWING RE-CONNECTION OPERATION IS NOT REQUIRED for step S404), the process moves to step S406 and the process ends in step S406.

After all display screens are caused to be "display OFF" in step S403, in the case where the process moves to step S406 from step S404, the display states of the message display screens are "display OFF", the device connection state remains "connection ON" state, and the signal remains active. Therefore, after the input channel is switched to another channel, in the case where the input channel is switched back to the storage input channel, the function can be used from the initial screen. Note that the reason why all of the message display screens are caused to be "display OFF" is as follows: if some display screens remain in "display ON" state, then when the input channel is switched back to the storage input channel, in the case where the display acknowledgement operation is performed, the input channel is switched again to another channel. The above reason is for avoiding this situation.

Also, after all display screens are caused to be "display OFF" in step S403, in the case where the process moves to step S405 from step S404, the display states of the message display screens are caused to be "display OFF", the device connection state becomes "connection OFF" state, and the signal is caused to be inactive. By this, in response to the user's explicit switching instruction, the storage file projection function can be ended unfailingly. This configuration is especially useful in the case where an authentication is required at the beginning of the function. And by making these operations switchable by the user setting, the flexibility and the usability improve.

Note that in the above description, the storage input channel is mainly described, but the same description can be applied to the network input channel. Also, in the above embodiments, the existence and non-existence of the image signal input is determined based on the connection state reported by the storage connection state management unit 244 and the display state of the message display screen retained by the display state retaining unit 234. However, regarding a channel in which a function-activated period (from the beginning to the end of the function) does not depend on the device connection state, different determination criteria can be set.

For example, regarding the network channel for which a file is obtained from the content management server 130 and projected, the network connection state can be assumed as the device connection state, and the network connection state is unstable in many cases. Regarding this kind of channel, by assuming that the device connection channel is always "connected", the determination of the existence and non-existence of the signal can be configured to be performed solely based on the display state of the message display screen. In this case, even in the case where the message display screen is closed and the state becomes "display OFF", the state of the image signal of the channel is kept active. By this, an unintentional channel switching probability due to the input-coordinated channel switching function can be reduced.

As described above, according to the present embodiments, an image output system, an image signal generation apparatus and a recording medium that stores a program, for switching an image outputting channel based on the state of the multiple channels can be provided. In the image output system, the channel switching can be performed after appropriately displaying information related to the currently displaying channel.

Preferably, the channel switching can be performed after waiting for a user's acknowledgement operation for a display message. Furthermore, while an input-coordinated channel switching function is activated, in the case where a message display screen in accordance with an end of a function is to be projected, the channel can be switched after sufficiently showing the message display screen to the user. Therefore, such a situation can be avoided in which the image outputting channel is switched to another channel before the message display screen that should be seen by the user is projected.

Note that in the above description, as examples of the image output system, a projector 110; a system in which a projector 110 and an information terminal 120 are combined;

and a system in which a projector 110, an option, and an information terminal 120 are combined have been described. However, the image output system is not limited to a system in which an image is projected on a screen. It can be any apparatus or system that includes an image output function such as a display, a television set, a digital photo frame, a digital camera, a video camera, etc.

Note that the functional units described above can be implemented by computer-executable programs written in legacy programming languages such as assembly language, C, C++, C#, Java (registered trade mark), etc., or other object-oriented programming languages. These programs can be stored in a machine-readable recording medium such as a ROM, an EEPROM, an EPROM, a flash memory, a flexible disk, a CD-ROM, a CD-RW, a DVD-ROM, a DVD-RAM, a DVD-RW, a blue-ray disk, an SD card, an MO, etc., or can be distributed through telecommunication lines. Also, a part of or all of the above functional units can be implemented on a programmable device (PD) such as a Field Programmable Gate Array (FPGA), etc., or on an ASIC (Application Specific Integrated Circuit). And in the case where the above functional units are implemented on the PD, a circuit configuration data (bit stream data) to be downloaded onto the PD can be distributed by a recording medium in which data is written in HDL (Hardware Description Language), VHDL (VHSIC (Very High Speed Integrated Circuits) Hardware Description language), Verilog-HDL, etc., for generating the circuit configuration data.

Further, the present invention is not limited to these embodiments, and various variations and modifications may be made without departing from the scope of the present invention.

The present application is based on and claims the benefit of priority of Japanese Priority Application No. 2012-241821 filed on Nov. 1, 2012, with the Japanese Patent Office, the entire contents of which are hereby incorporated by reference.

What is claimed is:

1. An image output system comprising:
a plurality of channels, each of the plurality of channels being configurable to output an image signal; and
circuitry configured to:
switch among the plurality of channels to select a currently outputting channel that outputs the image signal to an image output unit, which is selected based on connection states of each of the plurality of channels;
generate an information display screen related to the currently outputting channel;
store a display state related to the information display screen, the display state specifying one of a "display ON" state and a "display OFF" state;
switch to another channel of the plurality of channels when a connection state of the currently outputting channel changes and the display state changes from the "display ON" state to the "display OFF" state; and
perform a process of releasing a connection corresponding to the currently outputting channel when a predefined error occurs in the currently outputting channel.

2. The image output system as claimed in claim 1, wherein the circuitry is further configured to
provide an image that is output to the image output unit, generate the image signal, which corresponds to the image, determine a signal state specifying whether the image signal is "active" or "inactive" based on the connection state of the currently outputting channel and the display state related to the information display screen, and switch to the another channel of the plurality of channels based on signal states of image signals of the plurality of channels.

3. The image output system as claimed in claim 2, wherein the circuitry is further configured to manage the connection states for each of the plurality of channels.

4. The image output system as claimed in claim 2, wherein, in response to a user's instruction to switch from the currently outputting channel to the another channel, the information display screen is closed.

5. The image output system as claimed in claim 2, wherein when activation of a function corresponding to the currently outputting channel does not depend on the connection state of the currently outputting channel, and
a signal state of the currently outputting channel remains "active" independent of whether, there is a change in the display state of the currently outputting channel.

6. The image output system as claimed in claim 1, wherein the information display screen is displayed independently for each of the plurality of channels, and
the circuitry is further configured to monitor the connection states of the plurality of the channels while an input-coordinated switching function is activated.

7. The image output system as claimed in claim 1, wherein the display state changes from the "display ON" state to the "display OFF" state responsive a user's operational event or an internal event.

8. The image output system as claimed in claim 7, wherein the circuitry is further configured to determine the connection state of the currently outputting channel when the display state changes from the "display ON" state to the "display OFF" state in response to the user's operational event or the internal event, and
switch to the another channel of the plurality of channels only when the connection state of the currently outputting channel specifies a "connection OFF" state.

9. An image signal generation apparatus for generating an image signal, the image signal generation apparatus comprising:
circuitry configured to:
provide an image that is output to an image output unit and to generate an image signal of the image;
switch among a plurality of channels to select a currently outputting channel that outputs the image signal to the image output unit, which is selected based on connection states of each of the plurality of channels;
generate an information display screen related to the currently outputting channel;
store a display state related to the information display screen, the display state specifying one of a "display ON" state and a "display OFF" state;
switch to another channel of the plurality of channels when a connection state of the currently outputting channel changes and the display state changes from the "display ON" state to the "display OFF" state; and
perform a process of releasing a connection corresponding to the currently outputting channel when a predefined error occurs in the currently outputting channel.

10. A non-transitory computer readable recording medium in which a program for causing a computer to execute an image signal generation method for generating an image signal is stored, the image signal generation method comprising:
an image generation step of communicating with an image providing unit for providing an image that is output to an image output unit and generating the image signal of the image;

a switching step of switching among a plurality of channels to select a currently outputting channel that outputs the image signal to the image output unit, which is selected based on connection states of each of the plurality of channels;

an information display generation step of generating an information display screen related to the currently outputting channel;

a display state storing step of storing a display state related to the information display screen, the display state specifying one of a "display ON" state and a "display OFF" state; and perform a process of releasing a connection corresponding to the currently outputting channel when a predefined error occurs in the currently outputting channel, wherein the switching step includes a step of switching to another channel of the plurality of channels when a connection state of the currently outputting channel changes and the display state changes from the "display ON" state to the "display OFF" state.

* * * * *